United States Patent [19]
Bafford

[11] Patent Number: 5,858,524
[45] Date of Patent: Jan. 12, 1999

[54] FLEXIBLE LAMINATES BONDED WITH WATER-BASED LAMINATING INK VEHICLES AND LAMINATING ADHESIVES

[75] Inventor: Richard Anthony Bafford, Macungie, Pa.

[73] Assignee: Air Products and Chemicals, Inc., Allentown, Pa.

[21] Appl. No.: 746,263

[22] Filed: Nov. 7, 1996

[51] Int. Cl.$^6$ .................................. B32B 3/26; B32B 3/00
[52] U.S. Cl. .................. 428/320.2; 428/195; 428/321.1; 428/483; 428/414; 428/461
[58] Field of Search ..................... 523/201, 202; 524/804; 525/902; 428/35.8, 35.9, 36.6, 36.7, 320.2, 321.1, 461, 483, 414, 195

[56] References Cited

U.S. PATENT DOCUMENTS

| | | | |
|---|---|---|---|
| 3,033,707 | 5/1962 | Lacy et al. | 177/76 |
| 3,404,114 | 10/1968 | Snyder et al. | 260/29.6 |
| 3,625,795 | 12/1971 | Knechtges et al. | 156/291 |
| 4,132,831 | 1/1979 | Dickert et al. | 428/458 |
| 4,483,712 | 11/1984 | Murphy et al. | 106/30 |
| 4,948,822 | 8/1990 | Iovine et al. | 523/201 |
| 5,037,700 | 8/1991 | Davis et al. | 428/414 |

*Primary Examiner*—William Krynski
*Assistant Examiner*—Cathy F. Lam
*Attorney, Agent, or Firm*—Russell L. Brewer

[57] ABSTRACT

This invention relates to improved flexible laminates formed from at least one corona treated polyolefin or polyester film bonded to another polymeric or cellulosic film via an aqueous based laminating adhesive. The improvement in the flexible laminates resides in the aqueous based laminating adhesive used to bond the respective films. The aqueous based laminating adhesive is comprised of an acrylic interpolymer prepared by emulsion polymerizing alkyl (meth) acrylates, $\alpha$-$\beta$ unsaturated olefins, such as styrene and suitably substituted styrenes, and/or $\alpha$-$\beta$ unsaturated nitriles, such as acrylonitrile with a glycidyl (meth)acrylate and having the pendent epoxy group converted to the hydroxy amine. The preferred pendant units are hydroxy propylamine groups.

14 Claims, No Drawings

FLEXIBLE LAMINATES BONDED WITH WATER-BASED LAMINATING INK VEHICLES AND LAMINATING ADHESIVES

TECHNICAL FIELD OF THE INVENTION

This invention relates to flexible laminates formed from polymeric films bonded with a laminating adhesive and/or a laminating ink formulated with the laminating adhesive vehicle.

BACKGROUND OF THE INVENTION

Laminating adhesives and laminating inks are used in the preparation and printing of multi-layer flexible packaging formed from thin polymeric films. A major application market for such flexible packaging is in the packaging of snack foods such as potato chips, pretzels, etc. These applications often require in addition to flexibility and printability that the packages be impermeable to water vapor but permeable to carbon dioxide. Flexible films consisting of as many as seven film layers are used in the industry are often used to prepare packages having these properties.

A construction of a flexible package, for example, consists of an oriented polypropylene (OPP) film which has been laminated with a laminating adhesive of laminating ink with at least one other polymeric film. One construction for preparing a potato chip package involves extruding molten polyethylene onto the face of a printed film and then laminating a second film, such as OPP to the polyethylene coated printed film and that construction bonded to a second OPP film. Ink coverage can be as high as 100%. An alternative construction consists of a metallized polyethylene terephthalate base film, an extruded polyethylene, and a reverse printed OPP.

Environmental regulations are driving the industry to water based systems. Water-borne flexo inks are now the major inks used for printing of paper and linerboard. Water-borne inks for printing flexible films, such as oriented polypropylene (OPP), polyethylene (PE), polyethylene terephthalate (PET), and polyvinyl chloride (PVC have been developed but they have failed to meet the requirements of a good laminating vehicle which include good printability and good bonding to the printed film and yet function as to bond to the films.

Representative literature regarding laminating inks and/or laminating adhesives are as follows:

U.S. Pat. No. 3,033,707 discloses film and foil packaging articles formed by laminating polymeric films, particularly saran-coated regenerated cellulose as well as polyolefins to provide flexible, vapor-proof materials. The adhesive used in bonding the films are based upon polyalkyleneimines dispersed within an organic solvent.

U.S. Pat. No. 3,404,114 discloses latexes having adhesion and freeze stability which are suited for use as adhesives for the coatings industry. The latexes comprise from about 1 to 25% of an unsaturated carboxylic acid, from about 50 to 98% of vinylidene monomers or alkyl acrylates and from about 1 to 25% of alkyl amino-alkyl esters of acrylic and methacrylic acid. One of the latex recipes discloses emulsion polymers comprising about 65% ethylacrylate, 31% methyl methacrylate, 1.5% of acrylic and methacrylic acid, and 3% tertiary butylaminoethyl acrylate.

U.S. Pat. No. 3,625,795 discloses a process for depositing an adhesive and for bonding laminates resistant to delamination by spraying an aqueous polymeric latex containing carboxyl functionality onto the material, and the latex droplets deposited as discrete raised spots rather than a continuous film. A wide variety of monomers can be used in preparing the latex which includes lower alkyl esters of acrylic and methacrylic acid, a variety of comonomers, which include conjugated dienes, vinyl halides, vinyl esters, such as vinyl acetate, N-alkylol amides, e.g., N-methylol acrylamide, and other amides. An example shows a latex formed from ethyl acrylate, 2-ethylhexyl acrylate, N-methylol acrylamide, acrylamide, methacrylic acid, and methylene bisacrylamide. The emulsion when applied as discrete droplets impart improved peel strengths to laminates.

U.S. Pat. No. 4,132,831 discloses laminates prepared by a process comprising the addition of a binding amount of a linear, acylated polyalkylenepolyamine. An example shows the application of an aqueous solution of a poly(N-propionyl)ethylenimine to a bleached Kraft paper. Polyethylene film then is applied to the poly(N-propionyl) ethylenimine coated paper and passed through a cold roller. Excellent adhesion had been obtained with this particular acylated polyethyleneimine adhesive.

U.S. Pat. No. 4,483,712 discloses water-borne laminating inks which are printed onto plastic films and subsequently laminated to another plastic film. The ink comprises a binder comprising shellac or copol, water, a base, a water-reducible titanium ester chelate and a colorant. The ink is especially suitable for printing on polyolefin films, particularly oriented polypropylene film which has been corona treated.

U.S. Pat. No. 5,037,700 discloses curable, water-borne laminating adhesive. The adhesives suited for producing woven and nonwoven fabrics, oriented and non-oriented polyethylene and polypropylene films, metallic foils and metallized films for use in flexible packaging, graphic arts, etc. A component of the adhesive comprises at least 60% by weight of an alkyl acrylate or methacrylate, 1 to 10% by weight of unsaturated carboxylic acid, and 0 to 39% of a hydroxyalkyl acrylate or methacrylate and N- methylol acrylamide and a nitrogen-containing monomer such as acrylonitrile, allyl carbamate or an alkylated allyl carbamate.

SUMMARY OF THE INVENTION

This invention relates to improved flexible laminates formed from at least one corona treated polymeric film, e.g., a polyolefin or polyester film bonded to another metallic or polymeric film via an aqueous based acrylic laminating adhesive. The improvement in the flexible laminates resides in the aqueous based laminating adhesive used to bond the respective films. The aqueous based acrylic laminating adhesive is comprised of an acrylic interpolymer prepared by emulsion polymerization of a monomer system comprised of alkyl (meth)acrylates in combination with a glycidyl (meth)acrylate and the epoxide converted to a hydroxy aminoacrylate, preferably a hydroxy propylamine by reaction of polymer containing the polymerized units of glycidyl (meth)acrylate with an amine.

The reaction chemistry to produce the laminating adhesive interpolymer is as follows:

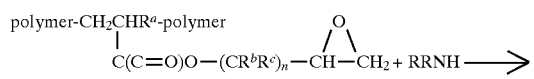

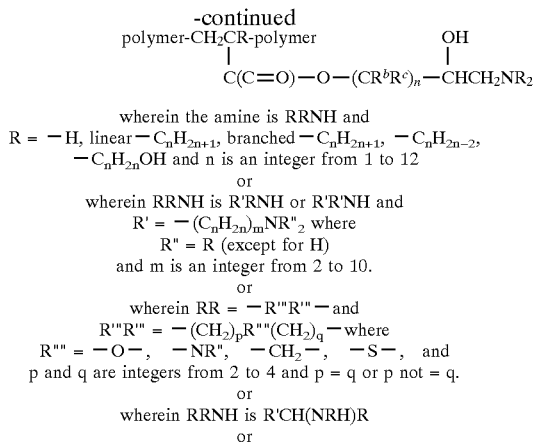

-continued wherein the amine is RRNH and
R = —H, linear —$C_nH_{2n+1}$, branched —$C_nH_{2n+1}$, —$C_nH_{2n-2}$, —$C_nH_{2n}OH$ and n is an integer from 1 to 12 or wherein RRNH is R'RNH or R'R'NH and
R' = —$(C_nH_{2n})_mNR''_2$ where
R" = R (except for H)
and m is an integer from 2 to 10.

or wherein RR = —R'"R'"— and
R'"R'" = —$(CH_2)_pR''''(CH_2)_q$— where
R'''' = —O—, —NR", —$CH_2$—, —S—, and
p and q are integers from 2 to 4 and p = q or p not = q.

or wherein RRNH is R'CH(NRH)R or where the amine is 2-aminopyridine, 3-aminopyridine, 4-aminopyridine and $R^a$ is hydrogen or methyl, $R^b$ and $R^c$ are hydrogen or $C_{1-8}$ alkyl.

The "polymer" is the residue of polymerized ethylenic unsaturated units, e.g., polymerized acrylic monomer units utilized in forming the laminating adhesive. The invention also relates to the aqueous emulsion based laminating adhesives which have been formed in the presence of a resin stabilizer system.

There are significant advantages associated with the flexible laminates bonded with the interpolymer adhesives, and particularly the resin stabilized emulsions, described herein and these include:

an ability to form flexible laminates from corona treated polyolefin, polyester, or metallized polyester films having strong bonds to a second polymeric film polyolefin, polyester, or metallized polyester film laminated to a printed film;

an ability to form ink formulations from the laminating vehicles which have essentially no volatile organic components therein, thereby rendering the ink formulations environmentally friendly;

an ability to form flexible laminates utilizing an aqueous emulsion which possesses desirable rheological properties; and, an ability to form pigmented dispersions to yield laminating inks with excellent binding properties suitable for printing by processes such as flexography, gravure and offset gravure.

DETAILED DESCRIPTION OF THE INVENTION

The flexible laminates generated in accordance with this invention are those formed from at least one thin polymeric film, primarily of polyethylene, polypropylene, polyvinyl chloride, polyvinylidene chloride as well as polyesters, such as polyethylene terephthalates, cellulose, and polyamides. At least one of the polymeric films is corona treated, and preferably all of the polymeric films requiring adhesion promotion are corona treated. The films from these polymers typically have a thickness ranging from about 0.5 to 2 mil. In the formation of the flexible laminates, polymeric films having barrier providing characteristics are bonded to other polymeric surfaces, paper, or metallic foils such as aluminum foil to produce a flexible package. Typical flexible laminates of the type contemplated herein are formed from thin films of corona treated polypropylene or polyethylene bonded to thin films of polyester, polyamide, or polyvinylidene chloride aluminum foil, paper, etc.

A key to preparing flexible laminates for the packaging of foodstuffs having enhanced properties with regard to printability and enhanced resistance to delamination are based upon the utilization of an aqueous emulsion adhesive composition formed from a combination of hydrophobic monomers and glycidyl (meth)acrylate converted to a hydroxy alkylamine via reaction with an amine or ammonia.

A wide variety of comonomers can be polymerized with the aminoalkyl (meth)acrylate. The selection of the comonomers is dictated by the end use application of the laminating adhesive or laminating ink vehicle. Typically, the $T_g$ of the copolymer will be within a range of from −50° to +60° C. For packaging of frozen foods, a low $T_g$ (−20° to +10° C.) polymer is preferred so that the printed ink film does not become brittle. For packaged foods stored at ambient temperature, a higher $T_g$ (+50° C.) polymer can be used.

Conventional and copolymerizable monomers which are employed in the synthesis of aqueous laminating adhesives, sometimes referred to as laminating ink vehicles and laminating ink letdown vehicles, include alkyl esters of acrylic or methacrylic acid having an alkyl ester portion containing from about 1 to 12 carbon atoms. Typically, the acrylate esters should have at least 4 carbon atoms as in butyl acrylate for desired hydrophobicity. Examples of hydrophobic acrylates and methacrylates include, ethyl methacrylate, butyl acrylate, butyl methacrylate, propyl methacrylate, 2-ethylhexyl acrylate, as well as styrene, alpha-methyl styrene, and ethylene, acrylonitrile, maleate esters such as ethyl maleate and mixtures of the same. Preferred monomers include the methacrylates such as methyl methacrylate, butyl acrylate and 2-ethylhexyl acrylate.

Subsequent to the emulsion polymerization process, the polymer containing polymerized units of the glycidyl acrylates are converted to the hydroxy alkyl amino unit. Amines suited for converting the epoxy group present in the glycidyl unit to the terminal group ($NR_2$) are numerous and include a wide variety of primary and secondary amines, as well as ammonia. Representative amines (RRNH) include $C_{1-8}$ alkyl amines, $C_{1-8}$ alkanolamines and cycloaliphatic amines such as piperidine and morpholine. Specific examples include methyl and dimethyl amines, ethyl and diethyl amine, propyl and dipropylamine, butyl and dibutyl amine and other alkyl amines; ethanol and diethanolamine, di-n- and diiso-propanol amine; and iso-propyl and diisopropylamine. Polyamines such as N,N-dimethylaminoethylenediamine, 3, 3'-iminobis (N,N-dimethylpropyl) amine, 2-amino-5-diethylaminopentane, and 3-dimethylaminopropylamine can be used; however, it is preferred that only one of the amine groups be primary or secondary. Representative hydroxy aminoalkyl units include the hydroxy amine units in said acrylic polymer are referred to as amino-hydroxyalkylacrylates, i.e., the superscripts b and c and the subscript n in the formula are 1. These are selected from the group consisting of:

3-(dimethylamino)-2-hydroxypropyl acrylate, 3-(diethylamino)-2-hydroxypropyl methacrylate, 3-amino-2-hydroxypropyl acrylate, 3-t-butylamino-2-hydroxypropyl methacrylate, 3-methylamino-2-hydroxypropyl acrylate, 3-n-butylamino-2-hydroxypropyl methacrylate, 3- amino-2-hydroxypropyl methacrylate 3-piperidino-2-hydroxypropyl methacrylate, 3-morpholino-2-hydroxypropyl methacrylate, 3-(dimethylaminoethylamino)-2-hydroxypropyl methacrylate, 3-(3'-dimethylaminopropylamino)2-hydroxypropyl methacrylate, 3-N-(2'-pydridinylamino)-2-hydroxypropyl methacrylate, 3-N-(3'-pyridin ylamino)-2-hydroxypropyl methacrylate, 3-N-(4'-pyridinylamino)-2-hydroxypropyl methacrylate, 3-N-(4'-pyridinylamino)-2-hydroxypropyl acrylate, 3-diethylamno-2-hydroxypropyl methacrylate, 3-diethylamino-2- hydroxypropyl methacrylate, 3-N-methylpiperazino-2-hydroxypropyl methacrylate, 3-[di(dimethylaminopropyl)amino]-2-hydroxypropyl methacrylate, 3-(4'-diethylamino-1'-methylbutylamino)-2-hydroxypropyl methacrylate, and 3-(4'-dimethylaminobutylamino)-2-hydroxypropyl acrylate.

The hydroxy aminoalkyl units pendent from the polymerized glycidyl (meth)acrylate units in the laminating adhesive copolymer can range from about 4 to 50% and preferably from about 15 to 30% by weight. The calculation is based upon the weight of the glycidyl (meth)acrylate polymerized into the laminating adhesive and does not take into consideration the weight of amine employed for converting the epoxy groups to hydroxy alkyl amine groups. The film to film bond strength is proportional to the hydroxy alkyl amine content of the polymer and therefore a high level of glycidyl (meth)acrylate (>4% and generally >8%) is preferred. The amount of glycidyl (meth)acrylate in the polymer will depend on the film to film bond strength desired.

The polymers preferably are comprised of the following monomer components:

(a) acrylate/methacrylate—40 to 65%, preferably 50 to 65% by weight (b) styrene/α-methylstyrene—0 to 30% preferably 5 to 25% by weight (c) glycidyl (meth)acrylates—3 to 50% preferably 8 to 30% by weight;

Emulsion polymerization of ethylenically unsaturated monomers to produce polymer dispersions is well known and conventional emulsion polymerization processes can be used to form the hydrophobic copolymers incorporating the amine or amide functionality. The emulsion polymerization process may be a batch process which involves a homogenization period in which a portion of the monomer is suspended in water and is thoroughly agitated in the presence of a comonomer while the system is gradually heated to polymerization temperature. The homogenization period is followed by a polymerization period during which the initiator system, which consists of generally of a peroxide and an activator, (as described in the literature), which are added incrementally. Alternatively, the emulsion polymerization process can rely on incremental addition of the monomers in order to produce a copolymer having a desirable distribution of the comonomers. In that case, water and the stabilizing system are added to the reactor with the monomers being added incrementally (delay addition) over time. The catalyst system comprising the oxidizing agent and reducing agent or thermal initiator are added to maintain a preselected reaction rate.

A wide variety of emulsifying agents can be used in generating the stabilizing system for effecting emulsion polymerization of the monomer systems. In the preparation of the laminating adhesives, conventional surfactant stabilization, resin stabilization, or a combination of the two may be employed in the emulsion polymerization process. In surfactant stabilized emulsions, suitable non-ionic emulsifying agents include polyoxyethylene condensates. Polyoxyethylene condensates may be represented by the general formula:

$$R(CH_2-CH_2-O)_nH$$

where R is the residue of a fatty alcohol containing 10–18 carbon atoms, an alkyl phenol, a fatty acid containing 10–18 carbon atoms, an amide, an amine, or a mercaptan, and where n is an integer of 1 to 50 or above. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thioethers such as polyoxyethylene n-dodecyl thioether.

One class of non-ionic emulsifying agents which can be used include a series of surface active agents known as "Pluronics." The "Pluronics" have the general formula:

$$HO(C_2H_4O)_a(C_3H_6O)_b(C_2H_4O)_cH$$

where a, b, and c are integers of 1 or above. As b increases, the compounds become less water soluble or more oil soluble and thus more hydrophobic when a and c remain substantially constant.

Some examples of nonionic emulsifying agents sold under the Pluronic trademark which can be used include polyoxyethylene-polyoxypropylene glycols conforming to the above general formula for "Pluronics" in which the polyoxypropylene chain has a molecular weight of 1500 to 1800 and the polyoxyethylene content is from 40 to 50 percent of the total weight of the molecule, a polyoxypropylene having a cloud point of about 140° F. and marketed under the trademark "Pluronic L-64"; a polyoxyethylene-polyoxypropylene glycol conforming to the above general formula for "Pluronics" in which the polyoxypropylene chain has a molecular weight of 1500 to 1800 and the polyoxyethylene content is from 80 to 90 percent of the total weight of the molecule and having a cloud point of about 212° F. and marketed under the trade mark "Pluronic F-68". "Pluronics" are obtained by condensing ethylene oxide on the polyoxypropylene base and the hydrophobic-hydrophilic nature of the resulting compound is controlled by varying the molecular weight of either the hydrophobic base or the hydrophilic portion of the molecule.

Another class of nonionic surfactants are sold under the Igepal trademark. One example within this class is a polyoxyethylene nonylphenyl ether having a cloud point of between 126° and 133° F. and marketed under the trade mark "Igepal CO-630"; another is polyoxyethylene nonylphenyl ether having a cloud point above 212° F. and marketed under the trade mark "Igepal CO-887." A similar polyoxyethylene nonylphenyl ether with a cloud point of about 86° F. is marketed under the trade mark "Igepal CO-610." Surfactants similar to the Igepal surfactants include a polyoxyethylene octylphenyl ether having a cloud point of between 80° F. and 160° F. marketed under the trademark "Triton X-100", a polyoxyethylene oleyl ether having a cloud point of between 80° F. and 160° F. marketed under the trade mark "Atlas G-3915" and a polyoxyethylene lauryl ether having a cloud point above 190° F. marketed under the trademark "Brij 35."

Anionic surfactants have also been widely use to produce the polymer systems for the coating compositions and can be used in producing the polymer dispersions. Representative anionic surfactants include alkali metal alkyl sulfates such as sodium lauryl sulfate, and the ammonium or sodium salt of a sulfate or phosphate ester of an alkylphenoxy poly (ethyleneoxy)ethanol, where the oxyethylene content is from 3 to 40 moles per alkyl phenol, complex organic phosphates (sold under the trademark GAFAC), alkylaryl sulfonates such as sodium dodecylbenzene sulfonate, sodium dodecyldiphenyl ether disulfonate and so forth.

Resin stabilized systems may be used to stabilize the laminating adhesive emulsion. Such stabilizers are known and typically comprise low molecular weight, compatible polymers having carboxyl functionality. This functionality then is converted to an ammonium salt by addition of ammonia.

Various free-radical forming initiators such as peroxide compounds can be used in carrying out the emulsion polymerization of the monomers. Combination-type initiators employing both reducing agents and oxidizing agents can also be used. The use of this type of combined initiator is generally referred to in the art as "redox polymerization" or "redox system." The reducing agent is also often referred to as an activator and the oxidizing agent as an initiator. Suitable reducing agents or activators include bisulfites, sulfoxylates, or other compounds having reducing properties such as ferrous salts and ascorbic acid, and tertiary aromatic amines, e.g., N,N-dimethylaniline. The oxidizing agents or initiators include hydrogen peroxide and organic peroxides such as benzoyl peroxide and t-butyl hydroperoxide.

A specific combination-type initiator or redox system which can be used is hydrogen peroxide and sodium formaldehyde sulfoxylate. Thermal initiators include persulfates, such as ammonium or potassium persulfate, or perborates, peracid anhydrides, percarbonates, azo compounds, peresters, and the like.

The initiator is employed in the amount of 0.1 to 2%, preferably 0.25 to 0.75%, based on the weight of monomer introduced into the system. The activator is ordinarily added as an aqueous solution and the amount of activator is generally from 0.25 to 1 times the amount of initiator.

The concentration range of the stabilizing agents used in emulsion polymerization is from 0.5 to 10% based on the aqueous phase of the latex regardless of the solids content. The stabilizers employed are, in part, governed by the use to which the copolymer latex is to be put. By utilizing appropriate levels of surfactant one can obtain latex polymer particles having a variety of average particle size ranges and distributions.

Conventional techniques for forming the laminates can be used here with one applying the adhesive to the film substrate for subsequent bonding. The adhesive may be applied by mechanical processes such as air knife, trailing blade, knife coater, reverse roll or gravure coating technique. Typically, after the adhesive is applied to the film, the adhesive coated film is passed through an oven to substantially remove the water and then through pressure the films are combined at a temperature from about 25° to 150° C. and thus bonded to form a flexible laminate.

Adhesion promotion of the polymeric films is achieved through corona treatment. The procedure is conventional for promoting adhesion in those films. In corona treatment, a polymeric film, such as polyester and polyolefin, is exposed to a high voltage. The high voltage effects a surface change on the film to promote adhesion. Many adhesive polymers show enhanced adhesion to the corona treated films vis-a-vis the non treated film, but surprisingly, the laminating adhesives or laminating vehicles incorporating the hydroxy aminoacrylate units in the proportion recommended have significantly increased adhesion vis-a-vis the non treated polymeric films.

Inks may be formulated in accordance with known techniques. Pigments are ground with suitable dispersing agents and other additives and the resultant pigment dispersion are let down with the laminating ink vehicle.

The following examples are provided to illustrate various embodiments of the invention and are not intended to restrict the scope thereof.

General Adhesive Test Procedures

The following laboratory test was used to simulate the lamination of polypropylene film to extruded polyethylene using the laminating ink and comparative ink vehicles described herein to provide bonding between the two films.

LAMINATING FILM INK VEHICLE AND LAMINATING ADHESIVE TEST PROCEDURE

1. Reduce the viscosity of each polymer dispersion or each ink formulated with polymer dispersion to 25 seconds using a #2 Zahn cup.

2. Corona treat the test film using a hand held Electro-Technic high voltage discharge gun. The film is given a two pass treatment. The test film is marketed under the designation, CGW-OPP, an oriented 70 gauge polypropylene film, by Mobil Corporation.

3. Coat the dispersion or ink onto the OPP with a 150 quad Anilox roller. Dry 10 seconds at 65.6° C. (150° F.). Allow sample to condition for 1 hour before laminating.

4. Lay a film of a metallized polyester/polyethylene laminate, the polyethylene side facing the coated OPP, onto the OPP. Using a Sentinel™ heat sealer with only the top bar heated, laminate by heat sealing at 163° C. (325° F.) at 30 psig for 2 seconds.

5. Condition heat sealed samples 24 hours at room 20°–25° C. temperature. Cut into one inch wide strips and measure the "T" bond strength on an Instron™ testing machine. Pull 4 strips and report the average bond strength in grams per inch width. Note any substrate tearing.

General Laminating Inks Formulation and Preparation

The formulation and preparation for a white ink is described. For inks other than a white ink, the white titanium dioxide pigment is replaced by the appropriate pigment. The pigments used for formulating other inks are listed in Table 1.

| White Laminating Ink Laminating Ink Letdown Vehicle The white pigment dispersions were prepared from the following: | |
|---|---|
| Component | grams |
| Vancryl 68S[1] | 15 |
| Water | 1.30 |
| Surfynol 420[2] | 0.70 |
| Dipropylene glycol monomethyl ether | 0.50 |

-continued

White Laminating Ink
Laminating Ink Letdown Vehicle
The white pigment dispersions were prepared from the following:

| Component | grams |
|---|---|
| Titanium Dioxide | 30 |

1. Vancryl ™ 68S is a trademark for the ammonium salt solution of a carboxylated styrenic oligomer manufactured by Air Products and Chemicals, Inc.
2. Surfynol ™ 420 is a trademark for an ethoxylated tetramethyldecynediol having form 3 to 10 ethylene oxide units manufactured by Air Products and Chemicals, Inc.

The pigment dispersion was prepared in a Cowles™ disperser. The pigment dispersion was let down with the enumerated laminating ink vehicle to give a laminating ink:

| Component | grams |
|---|---|
| Vancryl 68S | 11.0 |
| Example (aqueous polymer dispersion) | 35.0 |
| Water | 6.5 |

The viscosity of the ink was measured with a #2 Zahn cup. The ink then was roller printed onto corona treated CGW-OPP film, laminated, and tested by the Laminating Ink Letdown Vehicle Test described above.

TABLE 1

Pigments Used to Produce Laminating Inks

| Color | Pigment |
|---|---|
| White | Titanium Dioxide |
| Red | Sun ™ 211 3011 |
| Green | Cyan Green, Drew ™ GS 4000 |
| Blue | Sunsperse ™ Blue, BHD 6000 |
| Black | Cabot ™ Black 490 |
| Yellow | Sico ™ Yellow NBD 1360 |

Laminating Adhesive and Laminating Vehicle Polymerization

Unless otherwise noted, all emulsion polymerizations were carried out in a 2 liter jacketed glass reactor. The reactor was equipped with a pitched turbine agitator, thermocouple, ports for pumping in monomers and other additives, a reflux condenser, and a sparge for maintaining an inert atmosphere in the reactor. Tempered water was circulated through the reactor jacket so as to maintain the desired polymerization temperature. Deionized water was used in all experiments. The inerting gas was nitrogen. All monomers were commercial grade and used as received.

EXAMPLES 1–7

Examples 1 through 6 involve the preparation of a series of aqueous based surfactant stabilized laminating adhesive vehicles including controls for comparative testing. The flexible laminates then were tested via Example 7 in accordance with the above procedure and the results are set forth in Table 2.

Example 1

Surfactant Stabilized 16.4% Glycidyl Methacrylate Laminating Latex-Ammonia Treated To the reactor was charged 300 g of water ands 59.5 g of Abex™ 22S (a 25% active solution of the sodium salt of a proprietary anionic surfactant manufactured by Rhone Poulenc Corp.). The monomer mixture consisted of:

62 g of 2-ethylhexyl methacrylate,
117.5 g of n-butyl methacrylate,
28 g of styrene,
46.7 g of methyl methacrylate, and
10 g of glycidyl methacrylate The initiator was 2.5 g of 70% t-butyl hydroperoxide dissolved in 25 g of water and the reducing agent was 0.7 g of ascorbic acid and 0.5 g of aqua ammonia dissolved in 25 g of water. The reactor contents were heated to 50° C. and then 52.8 g of the monomer mixture, 2 g of the initiator solution and 1 g of the reducing agent solution were added to the reactor. Polymerization began. When the temperature reached 70° C., the remaining monomer mixture was added over a 90 minute period. The remaining initiator and reducing agent solutions were added over a 105 minute period. During the additions, the temperature was maintained at 70+/−3° C. At the 30, 45, 60, and 75 minute marks, 10 g portions of glycidyl methacrylate were added to the monomer mixture. When all the monomer mixture and initiator and reducing agent solutions had been added, the polymer dispersion was held at 70° C. for 15 minutes. To react any residual monomers, a solution of 0.5 g of 70% t-butyl hydroperoxide in 5 ml of water and 0.14 g of ascorbic acid in 5 ml of water were each added all at once to the reactor. When the residual unreacted monomer level was below 1000 ppm, the polymer dispersion was cooled to 50° C., and 22 g of aqua ammonia was pumped into the reactor over a 15 minute period. The polymer dispersion was held at 50° C. for one hour. The polymer dispersion was then cooled to room temperature and filtered through a 150 $\mu$ filter bag and the physical properties were determined.

The physical properties were: 41.94 % non-volatiles, pH 10.78, and the viscosity 44 cps @ 30 rpm and 44 cps @ 60 rpm.

Example 2 (control)

Surfactant Stabilized Acrylic 16.4% Methacrylic Acid Laminating Emulsion

The polymerization procedure was identical to that of Example 1 except that an equimolar amount of methacrylic acid was substituted for glycidyl methacrylate. The physical properties were: 42.27% non-volatiles, pH 3.25, viscosity 168 cps @ 30 rpm and 162 cps @ 60 rpm.

Example 3 (control)

Surfactant Stabilized 16.4% 2-Hydroxyethyl Methacrylate Laminating Emulsion

The polymerization procedure was identical to that of Example 3 except that an equimolar amount of 2-hydroxyethyl methacrylate was substituted for glycidyl methacrylate. The physical properties were 43.19% non-volatiles, pH 3.89, viscosity 1448 cps @ 30 rpm and 922 cps @ 60 rpm.

Example 4

Surfactant Stabilized 16.4% Glycidyl Methacrylate Laminating Latex-Diethylamine Treated The polymerization procedure was identical to Example 1 except that the 22 g of aqua ammonia was replaced by 25 g of diethylamine. The physical properties were: 43.07% non-volatiles, pH 11.5, and the viscosity 84 cps @ 30 rpm and 74 cps @ 60 rpm.

Example 5

Surfactant Stabilized 16.44% Acrylic Laminating Emulsion Staged Polymerization of Glycidyl Methacrylate This purpose of this example was to determine the effect of delaying the addition of glycidyl methacrylate and thus polymerizing the glycidyl methacrylate in the presence of the base polymer as well as determining the effectiveness of the epoxy groups in promoting adhesion.

To the reactor was charged 300 g of water, 22.5 g of Triton™ X-405 (a 70% active solution of alkylaryl polyether alcohol containing 40 ethyleneoxy groups which is manufactured by Union Carbide corp.) and 3.75 g of Witco™ SL-EP (a 30% active solution of sodium lauryl sulfate manufactured by Witco Corp.). Two monomer mixtures were prepared.

Monomer mixture #1 consisted of:

62 g of 2-ethylhexyl acrylate, 117.5 g of n-butyl acrylate, 0.5 g of 1,2 butylene glycol dimethacrylate, and 28 g of styrene.

Monomer mixture #2 consisted of:

46.7 g of methyl methacrylate and 25 g of glycidyl methacrylate.

The initiator solution consisted of 2.5 g of 70% t-butyl hydroperoxide dissolved in 25 g of water and the reducing agent solution consisted of 1.4 g of erythorbic acid, 0.5 g of aqua ammonia, and 25 g of water. The reactor contents were heated to 50° C. and 52.8 g of monomer mixture #1 was added to the reactor. Two ml of the initiator solution and 1 ml of the reducing agent solution were separately added to the reactor. Polymerization was started. The remaining monomer mixture #1 was added over a 60 minute period followed by a 30 minute addition of monomer mixture #2. The remaining initiator and reducing agent solutions were added over a 105 minute period. After completion of the additions, the polymer dispersion was held at 70° C. for 30 minutes. The polymer dispersion was checked by gas chromatographic analysis for residual unreacted monomer. The monomer content was less than 1000 ppm. The dispersion was cooled to room temperature and the physical properties determined.

The physical properties were: 42.04% non-volatiles, pH 5.44, and the viscosity 68 cps @ 30 rpm and 64 cps @ 60 rpm.

Example 6

Surfactant Stabilized 16.4% N-Vinylformamide Laminating Emulsion-Ammonia Treated The polymerization procedure was identical to that of Example 1 except that N-vinyl formamide was substituted for glycidyl methacrylate.

The physical properties were: 34.3% non-volatiles, pH 4.37, viscosity 2564 cps @ 30 rpm and 1778 cps @ 60 rpm.

Example 7

Laminating Adhesive Testing

The bond strengths of Examples 1 through 6 were tested by the previously described test forth in Table 2.

TABLE 2

| Example | "T" Bond Strength (g/in) |
|---------|--------------------------|
| 1 | 225.9 |
| 2 | 9.1 |
| 3 | 23.8 |
| 4 | 224.7 |
| 5 | 12.5 |
| 6 | 15.9 |

Discussion

The data of Table 2 clearly demonstrate that pendant hydroxy aminoalkyl groups are required for the enhanced laminate bond strengths of the polymer dispersions. Examples 1 and 4 where there are pendant amino groups off the polymer backbone show good "T" bonds. The Example 2 polymer containing pendant carboxyl groups and Example 3 polymer containing pendant hydroxyethyl groups gave very poor bond strengths even though those functional monomers had been conventionally employed in producing acrylic based laminating adhesives. The Example 5 polymer containing pendant expoxy groups, gave a very poor bond which demonstrates that ring opening with amines to give pendant amino groups is necessary for achieving outstanding and enhanced adhesion to the corona treated film. The Example 6 polymer which incorporated a nitrogen containing monomer, also gave very poor bond strengths. The results fairly demonstrate that it is the presence of the amine functionality that promotes adhesion with corona treated polymeric films.

Example 7

Resin Stabilized, Glycidyl Functional Vehicle

To the reactor was charged 100 g of Vancryl™ 65 (Vancryl 65 is a carboxylated polystyrene resin manufactured by Air Products and Chemicals, Inc.), 41 g of triethyl amine and 290 g of water. The mixture was heated at 50° C. until the resin dissolved. A monomer pre-emulsion was prepared from 260 g of water, 7.5 g of a 30% solution of sodium lauryl sulfate, and:

169.4 g of 2-ethylhexyl methacrylate, 113 g of butyl methacrylate, 42.4 g of styrene, 70.6 g of methyl methacrylate, and 20 g of glycidyl methacrylate.

An initiator solution was prepared from 10 g of 70% t-butyl hydroperoxide and 50 g of water. An activator solution was prepared from 2.8 g of ascorbic acid, 50 g of water, and 1.0 g of aqua ammonia. The contents of the reactor were heated to 50° C., and 75 g of the monomer pre-emulsion, 3 g of the initiator solution, and 1.5 g of the activator solution were added to the reactor. Polymerization was initiated and the temperature was allowed to rise to 70° C. While maintaining the temperature at 70+/−30° C., the remaining monomer pre-emulsion was added over 90 minutes, and the remaining initiator and activator solutions were added over 105 minutes. At the 30, 45, 60 and 75 minute marks, 20 g portions of glycidyl methacrylate were added to the monomer pre-emulsion. When additions were completed, the latex was held at 70° C. for 30 minutes, and checked for residual monomer. When the residual monomers were less than 1000 ppm, the latex was cooled to room temperature, filtered through a 100 g filter bag, and the physical properties determined.

The non-volatile content was 46.50%; the pH, 9.45; the viscosity, 208 cps #3 spindle at 30 rpm and 200 cps at 60 rpm. The latex contained 0.0539 mole of glycidyl functionality per 100 g of latex.

To 100 g of the latex was added 3.3 g (0.0375 mole) of N,N-dimethylaminoethyl amine and to a second 100 g sample was added 2.2 g (0.0250 mole) of the amine. The samples were stirred at room temperature at least 2 hours before being tested. The adhesion performance is listed in Table 3, entry 18.

Example 8

Surfactant Stabilized 11.6% Glycidyl Methacrylate Laminating Latex-Ammonia Treated To the reactor was charged 240 g of water. An emulsion was prepared from 480 g of water, 54 g of Harcos T-Det® O-407 (T-Det O-407 is a polyethoxylated octylphenol which is a 70% active product in water), #9 g of Witco SL-EP, in combination with the monomers:

148.8 g of 2-ethylhexyl methacrylate, 282 g of butyl methacrylate, 67.2 g of styrene, 112 g of methyl methacrylate, and 24 g of glycidyl methacrylate.

The oxidant consisted of 12 g of 70% t-butyl hydroperoxide dissolved in 53 g of water. The reductant consisted of 3.4 g of ascorbic acid and 1.2 g of aqua ammonia dissolved in 58 g of water. The reactor contents were heated to 70° C. At 50° C., 120 g of the monomer emulsion was added. When the temperature reached 70° C., 5 ml of the oxidant solution and 2.6 ml of the reductant solution was added to the reactor. Polymerization was initiated as evidenced by a slight exotherm. While maintaining the polymerization at 70+/−30° C., the remaining monomer emulsion was added over a 90 minute period. The oxidant and reductant solutions were added over a 105 minute period. At the 30, 45, 60, and 75 minute marks, 24 g increments of glycidyl methacrylate were added to the monomer emulsion. When all the ingredients were added to the reactor, the reactor contents were held at 70° C. for 30 minutes to complete the polymerization. A sample of the dispersion was analyzed for unreacted monomers by gas chromatography. The residual monomers were less than 100 ppm. The dispersion was cooled to 25° C. and characterized. The % non-volatiles were 46.97; the Brookfield viscosity was 180 cps., #3 spindle @ 30 rpm; and the pH was 4.3. The polymer dispersion was adjusted to a pH of 7.2 using 10% sodium hydroxide solution.

The dispersion contains 0.0515 moles of glycidyl functionality per 100 g of latex.

Example 9

Structure and Molar Concentration of Amine vs. Adhesion Performance

The Example 8 latex was treated with various amines at different mole ratios based on the stoichiometry in order to determine the effectiveness and amine concentration, i.e., the extent of epoxide ring opening on the "T" bond strength of the adhesive. (Full and partial ring opening was assumed at stoichiometric amine levels.)

Into a wide mouth jar was weighed 100 g of the latex and the appropriate amount of the amine. A stirring bar was placed in the jar and the lid screwed on the jar to prevent loss of the more volatile amines. The mixture was stirred at room temperature for at least 2 hours before testing. The results are summarized in Table 3.

TABLE 3

Addition of Amines to Glycidyl Functional Polymer[1]
Structure and Molar Concentration vs. Performance

| | | "T" Bond (g/in) Moles of Amine | | | | |
|---|---|---|---|---|---|---|
| Entry | Amine | 0.0500 | 0.0375 | 0.0250 | 0.0125 | 0.00625 |
| 1 | Ammonia | 233.8 | 19.3 | 10.1 | 5.7 | |
| 2 | Methyl amine | 240.6 | | | | |
| 3 | Dimethyl amine | 231.5 | 230.4 | 238.3 | 228.1 | 36.3 |
| 4 | Ethyl amine | 239.5 | | | | |
| 5 | Diethyl amine | 240.6 | | | | |
| 6 | n-Butyl amine | 228.1 | | | | |
| 7 | t-Butyl amine | 234.9 | | 192.9 | 90.8 | 13.6 |
| 8 | Piperidine | 240.6 | | 12.5 | | |
| 9 | Morpholine | 228.1 | | 202 | | |
| 10 | N,N-Dimethyl-ethylenediamine | 228.1 | | | 242.9 | 223.6 |
| 11 | 3-Dimethyl-aminopropyl-amine | 215.6 | | | 221.3 | 177 |
| 12 | 2-aminopyridine | 203.5 | | | | |
| 13 | 3-aminopyridine | 222.2 | | | | |
| 14 | 4-aminopyridine | 159.8 | | | | |
| 15 | N-Methyl-piperazine | 179.7 | | | | |
| 16 | 3,3'-Imino bis(N,N-dimethyl-propylamine) | 153.5 | | | | |
| 17 | 5-Diethylamino-2-aminopentane | 208.1 | | | | |
| 18 Ex.7 | N,N-dimethyl-aminoethyl amine | | | 227.3 | 227.3 | |

Discussion

While it is evident that a variety of amines (or ammonia) can be used to react with glycidyl groups to produce excellent "T" bonds, some amines are more effective than others. Primary and secondary amines, as well as the cycloaliphatic amines, morpholine and piperidine, were effective at the 0.05 mole level. Entries 10, 11, and 18 were especially effective at very low levels based upon stoichiometry. This may be due to the fact that they are diamines or due to the fact that the pendent terminal amine is further from the polymer backbone. Since the glycidyl functionality, per se, does not contribute to bond strength, less glycidyl methacrylate could be used in the latex if the more efficient diamines, i.e., entries 10, 11, and 18, for example, were used as reactants.

Example 10

Laminating Ink Formulations

Several inks were prepared employing the Example 5 laminating adhesive to determine the effectiveness of the latex in ink formulations as the laminating ink letdown vehicle. Table 4 sets forth the results.

TABLE 4

Laminating Inks, Bond Adhesion Values

| Example | Color | "T" Bond (g/in) |
|---------|-------|-----------------|
| 4 | white | 212.2 |
| 4 | red | 180.5 |
| 4 | blue | 133.9 |
| 4 | black | 228.1 |

Discussion

The results show that the Example 5 laminating adhesive was effective in producing a wide variety of ink formulations having good adhesion values. Typically, the substantial adhesiveness of the emulsion is lost when formulated into an ink. This aspect is fairly noted in the blue ink formulation which rendered a value of 133.9. This value, although lower than the other values, remains quite high in comparison to other commercial laminating adhesives.

What is claimed:

1. In a flexible packaging laminate formed from at least one corona treated polymeric film which is bonded with an aqueous laminating vehicle bonded to at least one other polymeric, cellulosic or metal film, the improvement in the flexible laminate which resides in an emulsion polymerized, aqueous based laminating vehicle comprised of an acrylic polymer having polymerized units of a monomer having an epoxide group, said monomer selected from the group consisting of glycidyl acrylate and glycidyl methacrylate, and the epoxide group converted to a hydroxy amine unit.

2. The flexible laminate of claim 1 wherein the acrylic polymer has a $T_g$ from about −50° to about +60° C.

3. The flexible laminate of claim 2 wherein the acrylic polymer is comprised of polymerized units of:
   (a) from 40 to 65% by weight of acrylate/methacrylate;
   (b) from 0 to 50% by weight styrene/α-methylstyrene; and,
   (c) from 3 to 50% by weight of converted glycidyl (meth)acrylate.

4. The flexible laminate of claim 3 wherein the acrylate polymer is comprised of a $C_{1-10}$ alkyl acrylate or a $C_{1-10}$ alkyl methacrylate.

5. The flexible laminate of claim 4 wherein the acrylate/methacrylate in said acrylic polymer is an acrylate/methacrylate selected from the group consisting of 2-ethylhexyl acrylate, butyl acrylate, isobutyl acrylate, methyl methacrylate and the amine portion of the acrylic polymer is derived from the reaction of the glycidyl groups of the polymer with ammonia, a primary, or secondary alkyl amine.

6. The flexible laminate of claim 5 wherein the amino acrylate in said acrylic polymer is present in an amount of from 8 to 30% by weight of the acrylic polymer and the laminating vehicle incorporates at least one ink pigment.

7. The flexible laminate of claim 5 wherein the hydroxy amine (meth)acrylate units in said acrylic polymer are amino-hydroxyalkylacrylates selected from the group consisting of:

3-dimethylamino-2-hydroxypropyl acrylate,
3-diethylamino-2-hydroxypropyl methacrylate,
3-amino-2-hydroxypropyl acrylate,
3-t-butylamino-2-hydroxypropyl methacrylate,
3-methylamino-2-hydroxypropyl acrylate,
3-n-butylamino-2-hydroxypropyl methacrylate,
3-amino-2-hydroxypropyl methacrylate
3-piperidino-2-hydroxypropyl methacrylate,
3-morpholino-2-hydroxypropyl methacrylate,
3-N',N'-dimethyl aminoethylamino-2-hydroxypropyl methacrylate,
3-(3'-dimethylaminopropylamino)-2-hydroxypropyl methacrylate,
3-(2'-pydridinyl amino)-2-hydroxypropyl methacrylate,
3-(3'-pyridinylamino)-2-hydroxypropyl methacrylate,
3-(4'-pyridinylamino)-2-hydroxypropyl methacrylate,
3-(4'-pyridinylamino)-2-hydroxypropyl acrylate,
3- dimethylamino-2-hydroxypropyl methacrylate,
3-diethylamino-2-hydroxypropyl methacrylate,
3-N-methylpiperazino-2-hydroxypropyl methacrylate,
3-[di(dimethylaminopropyl)amino-2-hydroxypropyl methacrylate,
3-(4'-diethylamino-1'-methylbutylamino)-2-hydroxypropyl methacrylate, and
3-(4'-dimethylaminobutylamino)-2-hydroxypropyl acrylate.

8. The flexible laminate of claim 7 wherein the polymeric films employed in the flexible laminate have a thickness from about 0.5 to about 2 mil.

9. The flexible laminate of claim 8 wherein at least one of the polymeric films employed in the flexible laminate is selected from the group consisting of polyethylene, polypropylene, polyvinyl chloride, polyvinylidene chloride, polyethylene terephthalate, cellulose, and polyamides.

10. The flexible laminate of claim 9 wherein at least one of the polymeric films in said flexible laminate is polypropylene.

11. The flexible laminate of claim 10 wherein the acrylic polymer is comprised of from 5 to 25 weight percent styrene or alpha methyl styrene.

12. The flexible laminate of claim 11 wherein the emulsion polymerized acrylic polymer is surfactant stabilized.

13. The flexible laminate of claim 11 wherein the emulsion polymerized acrylic polymer is stabilized by an ammonium salt of a carboxylated styrene resin.

14. The flexible laminate of claim 1 wherein the emulsion polymerized acrylic polymer is stabilized by an aminated styrene resin.

* * * * *